United States Patent [19]

Hazenbroek

[11] Patent Number: 4,896,399
[45] Date of Patent: Jan. 30, 1990

[54] ADJUSTABLE POULTRY CARCASS SEPARATOR

[76] Inventor: Jacobus E. Hazenbroek, Burg de Zeeuwstraat 52, Numansdorp, Netherlands

[21] Appl. No.: 304,542

[22] Filed: Jan. 31, 1989

[51] Int. Cl.⁴ .............................................. A22C 21/00
[52] U.S. Cl. ............................................ 17/11; 17/46
[58] Field of Search ....................... 17/11, 46, 52, 44.1

[56] References Cited

U.S. PATENT DOCUMENTS

| | | | |
|---|---|---|---|
| 3,686,712 | 8/1972 | Lewis | 17/11 |
| 4,184,230 | 1/1980 | Fox et al. | 17/11 |
| 4,282,633 | 8/1981 | Graham et al. | 17/11 |
| 4,558,490 | 12/1985 | Hazenbroek et al. | 17/11 |
| 4,597,133 | 7/1986 | van de Nieuwelaar | 17/11 |
| 4,709,448 | 12/1987 | McGuire et al. | 17/11 |

FOREIGN PATENT DOCUMENTS

| | | | |
|---|---|---|---|
| 584089 | 9/1959 | Canada | 17/11 |
| 8200001 | 1/1982 | World Int. Prop. O. | 17/11 |

Primary Examiner—Willis Little
Attorney, Agent, or Firm—Thomas & Kennedy

[57] ABSTRACT

An adjustable poultry carcass separator (10) includes a support frame (11), back cutter assembly (58), leg/thigh separator (125), and a conveyor system (20). Back cutter (58) includes cutters (84, 85, 88, 89, 103, 104) for separating the thighs from the back of the poultry carcass, and a movable backbone cutter (72) for movement between positions cutting the backbone and not cutting the backbone. Leg/thigh separator (125) includes a rotary guide wheel (126) having recesses (132) for receiving poultry legs/thighs. As guide wheel (126) rotates the leg and thigh are bent about the leg/thigh joint and moved through a cutting station (160) to separate the leg from the thigh. The separator (125) includes a stationary recess size adjusting plate (130) for adjusting the size of the recesses (132) and the amount of bending of the thigh and the leg relative to each other to allow the apparatus to be adjusted to accommodate different bird lengths.

11 Claims, 5 Drawing Sheets

ADJUSTABLE POULTRY CARCASS SEPARATOR

FIELD OF THE INVENTION

This invention relates to the processing of raw poultry by which the poultry product is prepared for human consumption. More particularly, this invention relates to a method and apparatus for separating poultry parts, such as separating the back from the thighs and the thighs from the legs of the birds in a continuous fully automated process.

BACKGROUND OF THE INVENTION

When previously eviscerated poultry carcasses are to be cut into parts, it is desirable that the parts be accurately separated from one another so that bone chips or fragments are not formed during the separating process and are not found in the separated parts. Further, it is desirable that the separating functions be performed in a rapidly operating automated system which accurately separates the parts from one another.

In recent years, more extensive use has been made of the overhead conveyor system in poultry processing plants, whereby the birds are suspended from an overhead conveyor system in an inverted attitude, with the legs of the bird supported in shackles that are carried by the conveyor system. The shackles move the birds through one or more processing stages, such as a vent cutter, a bird opener, an eviscerator, a neck breaker, a lung puller, and a crop remover. Further, the birds can be moved through various parts separating devices so that the carcasses are subdivided into, for example, separated breasts, backs, wings, legs and thighs.

One of the more difficult problems to be solved when cutting apart poultry carcasses in an automated, continuous operating system is to adjust the cutting mechanism to accurately cut poultry carcasses of different sizes. For example, when the carcasses are suspended from a conveyor shackle, the distance between the shackle and the joint between the leg and thigh which is to be cut so as to separate the thigh and the leg is greater for the longer birds and less for the shorter birds. This means that the cutting mechanism will not properly function to precisely cut into the joint and is more likely to cause a chipping of the bone as it performs its cut. Therefore, it is highly desirable to be able to adjust the parts separator system while in operation so as to change the location of the joint being cut with respect to the cutting mechanism, so that the cutting mechanism precisely cuts into the joint and performs an accurate separation of the carcass without leaving bone chips or otherwise improperly performing the separating function. Further, it is highly desirable that the separating system be adjustable so as to perform certain cuts as may be desired by one customer and other cuts which might be desired by some other customer. For example, there are some occasions when the back of a bird should be split along the backbone and other occasions when the back of a bird should be cut away from the adjacent thighs, so that the thighs are sold separately from the back. It is desirable to avoid stopping the processing line when a change of cut of this type is to be made.

SUMMARY OF THE INVENTION

Briefly described, the present invention comprises a poultry processing apparatus of the type used to separate the parts of poultry carcasses as the carcasses are suspended invertedly by their legs and the carcasses are conveyed in series along a processing path. The carcasses are passed first over a back separating apparatus where the back is cut along the backbone, or in the alternative, the back is cut away from the thighs of the poultry carcass. As the legs and thighs continue through the processing path, they are engaged by a guide wheel rotatable about an approximately upright axis, with the legs and thighs of the bird being received in recesses formed between adjacent protrusions of the wheel, so that the wheel carries the legs and thighs to a cutter. The legs are bent over the top of the periphery of the wheel and the thighs are bent beneath the periphery of the wheel, so that the joint between the legs and the thighs is bent open as the legs and thighs approach the cutter, so that the sharpened cutting blade can accurately cut into the space of the opened joint and separate the thigh from the leg without forming bone chips.

A recess size adjustment member is positioned adjacent the rotary guide wheel, with the adjustment member and guide wheel in an overlying relationship, and includes a curved edge portion that protrudes above and/or below the recesses of the guide wheel as those recesses move toward, adjacent and away from the cutter. The recess size adjustment member is movable so as to effectively cover more or less of the recesses of the guide wheel, so as to effectively change the sizes of the recesses as they pass adjacent the cutter. With this arrangement, when longer birds are being processed the recess size adjustment member can be moved to cover more of the recesses of the guide wheel, so that the joint between the leg and the thigh will be properly presented to the cutter. Likewise, the recess size adjustment means can be retracted so as to cover less of the recesses of the guide wheel, enabling shorter birds to be properly cut at the joints between the legs and thighs.

Thus, it is an object of this invention to provide a poultry processing apparatus which is utilized to separate the parts of poultry carcasses as the carcasses are suspended invertedly by their legs and conveyed in series along a processing path, with the apparatus being adjustable during the operation of the apparatus to properly form cuts on different sized birds.

Another object of this invention is to provide a poultry processing apparatus that separates the thighs from the legs of a bird, and which is adjustable as the apparatus is in operation to change the location of the cut being made between the legs and the thighs.

Another object of this invention is to provide a poultry processing apparatus which cuts along the backbone of each bird or can be expediently modified as the apparatus is in operation to cut on opposite sides of the backbone of the birds.

Another object of this invention is to provide a poultry processing apparatus that rapidly and accurately forms cuts in the backbones of the birds and separates the thighs from the legs of the birds, and which is adjustable to change the cuts being performed on the carcasses of the birds as it operates.

Other objects, features and advantages of this invention will become apparent upon reading the following specification, when taken in conjunction with the accompanying drawings.

DETAILED DESCRIPTION

Figure 1:
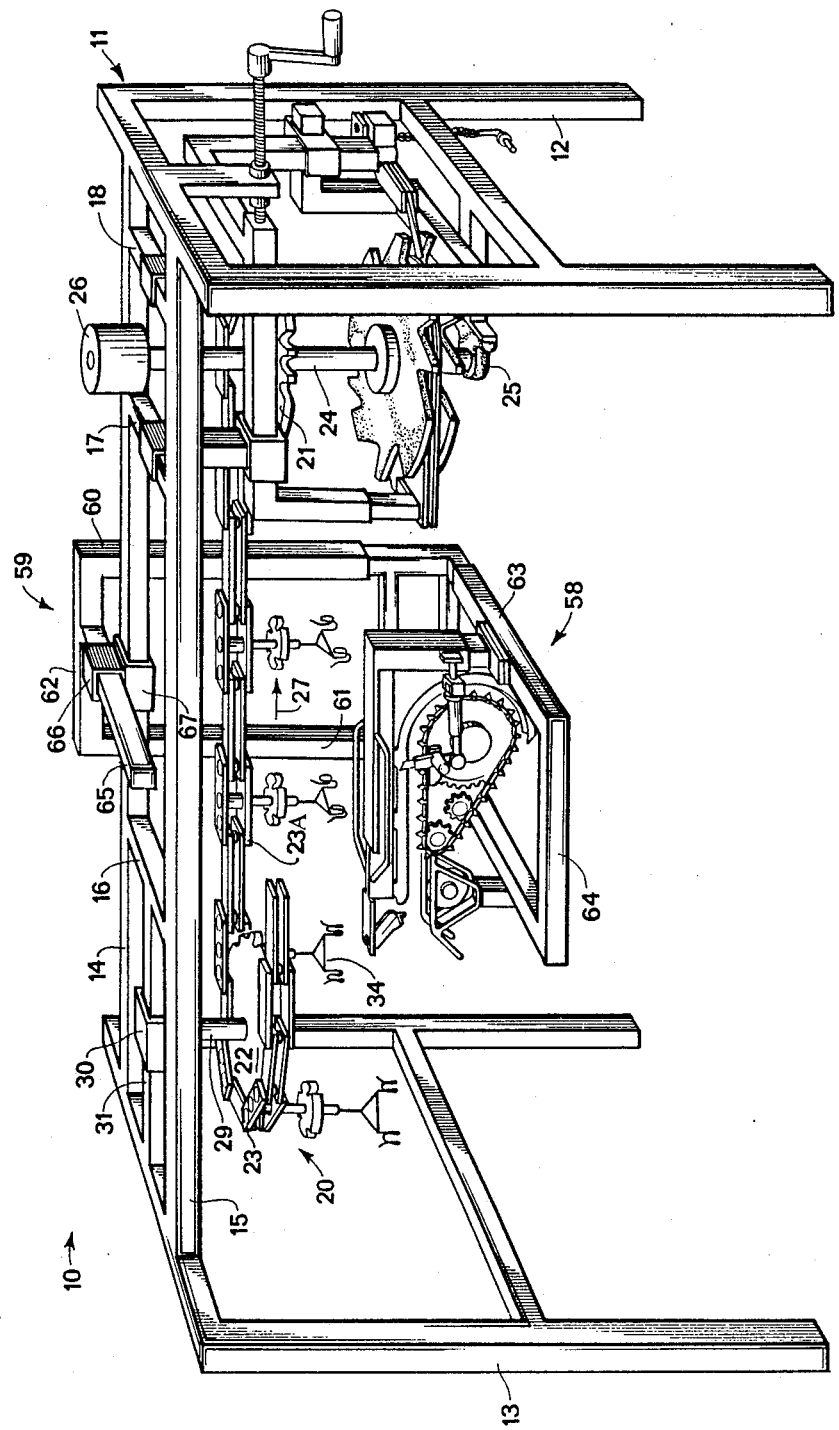
FIG. 1 is a perspective schematic illustration of the adjustable poultry carcass separator, with parts being remove for clarity.

Referring now in more detail to the drawings, in which like numerals indicate like parts throughout the several views, FIG. 1 illustrates a poultry processing apparatus 10 that comprises a framework 11 having end frames 12 and 13 and longitudinal frame members 14 and 15 each connected at their respective ends to end frames 12 and 13. Cross braces 16, 17 and 18 are mounted at their ends to the longitudinal frame members 14 and 15.

Conveyor system 20 is mounted to the framework 11 and includes drive sprocket 21, driven sprocket 22 and endless conveyor chain 23 extending about the sprockets 21 and 22. Drive sprocket 21 is mounted on upright axle 24, and the axle 24 is supported at its lower and upper ends by bearings, such as lower bearing 25. Electric motor 26 is attached to the upper end of axle 24 and functions to rotate the axle in a clockwise direction that moves the conveyor chain 23 in the direction as indicated by arrow 27. Driven sprocket 22 is mounted on its approximately upright axle 29, with the axle 29 being rotatably supported at its upper end on support sleeve 30. Support sleeve 30 is movable along the length of strut 31 which extends between cross brace 16 and end frame 13. The conveyor chain 23 can be loosened or tightened by moving support sleeve 30 along its strut 31.

Figure 2:
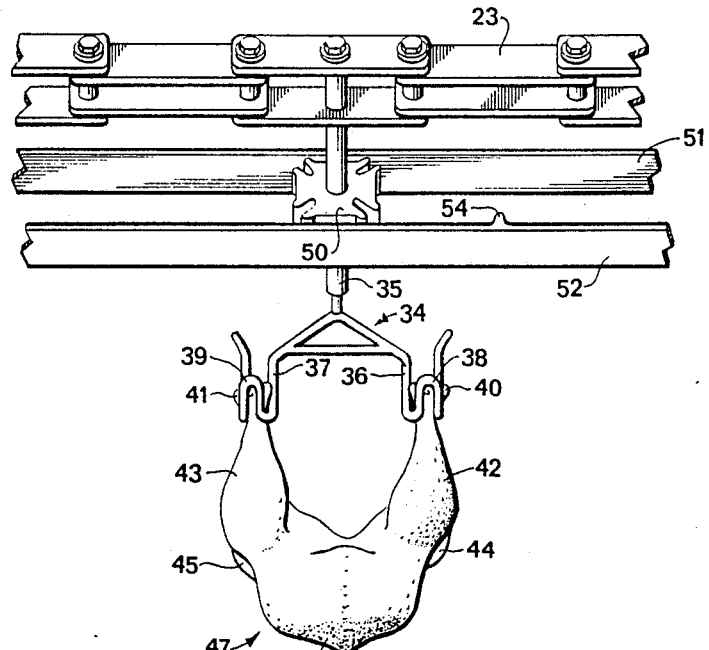
FIG. 2 is a perspective illustration of a detail of the conveyor system, showing a shackle and a portion of a poultry carcass suspended from the shackle.

A plurality of hangers or shackles 34 are suspended in spaced series along the conveyor chain 23 (FIG. 2). Each hanger 34 includes upright stem 35 that is connected at its upper end to the conveyor chain 23, and a lower bifurcated yoke portion that includes arms 36 and 37 that are spaced apart from each other and each of which includes at its lower end poultry leg joint receiving sockets 38 and 39 that are formed by bent end portions of the arms. The sockets are formed so that the joints at the end of the leg or "drum stick" from which the feet of the birds have been removed can be received in the sockets 38 and 39. With this arrangement, the leg joints 40 and 41 are received in the sockets 38 and 39, so that the legs or "drum sticks" 42 and 43 are suspended invertedly in spaced relationship from each other, so that the thighs 44 and 45 are also maintained in spaced relationship, and the back 46 is suspended beneath the legs and thighs.

A turning sprocket 50 is rigidly affixed to the upright stem 35 of each hanger 34, and hanger guides 51 and 52 extend beneath and parallel to the conveyor chain 23 and are spaced apart a distance corresponding to the diameter of the turning sprockets 50 of each hanger. Protrusions 54 are located on one or the other of the hanger guides 51 and 52 in the path of the turning sprocket 50 and engage a slot in a turning sprocket so as to require the turning sprocket to rotate 90 degrees to pass a protrusion. The protrusions are placed at positions along the hanger guides 51 and 52 so as to require the carcass of the bird suspended from the hangers 34 to be rotated as required to perform the separation of the carcass.

As illustrated in FIG. 1, back cutter 58 is suspended from the longitudinal frame member 14 beneath the flight 23A of the conveyor chain 23. The back cutter 58 is supported by its own movably mounted support frame 59 that includes upright beams 60 and 61, upper cross beam 62, and lower beams 63 and 64. Upper connecting beam 65 is rigidly mounted to upper cross beam 62 and extends through support block 66. Support block 66 is mounted to socket 67 which is slidable along longitudinal frame member 14. With the arrangement of the support block and sprocket 66, 67, the back cutter 58 can be positioned at various positions along the length of the framework and at various positions extending across the framework, but preferably is located in alignment with and directly beneath flight 23a of conveyor chain 23.

Figure 3:
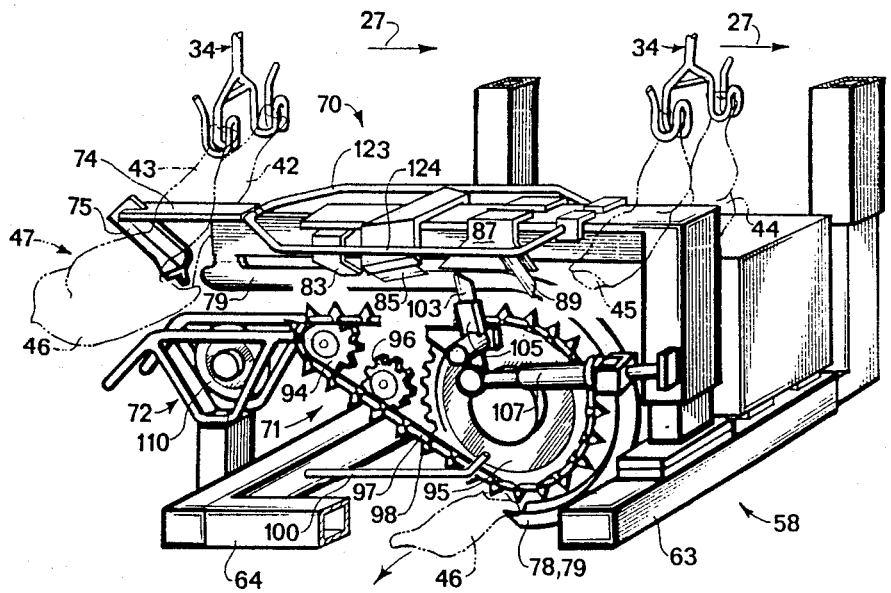
FIG. 3 is a perspective illustration of the back separating apparatus.

As illustrated in FIG. 3, back cutter 58 includes upper guide rail assembly 70, back conveyor assembly 71 positioned below and in alignment with the upper guide rail assembly 70, and backbone cutter 72 positioned ahead of back conveyor assembly 71. Upper guide rail assembly 70 extends along the path 27 of the conveyor system 20 so that the hangers 34 carry the birds 47 with their legs 42 and 43 presented in side by side relationship so that the legs straddle the guide rail 74. A back guide bar 75 is pivotably connected at one of its ends to the entry end of the guide rail 74, and engages the back 46 of the bird to deflect the bird downwardly into straddled relationship about guide rail 74 and its attachments.

A first pair of guide plates 78 and 79 (FIG. 4) extend along the path of the bird 47 in a horizontal direction aligned beneath guide rail 74, with the guide plates 78 and 79 spread apart a distance sufficient to straddle the backbone of the bird 47, so that when the bird passes beneath the guide plates 78 and 79, the backbone of the bird is received between the guide plates 78 and 79 and the guide plates stabilize and guide the bird as it moves through the back cutter 58. A pair of guide bars 80 and 81 are located beneath guide plates 78 and 79 and are aligned with the guide plates and are spaced apart a distance such as to receive the back portion 46 of the bird 47, and to support the back in a horizontal attitude as the hangers 34 carry the birds through the back cutter 58.

A pair of guide protrusions 82 and 83 are mounted to the guide rail 74 and extend downwardly on either side of the guide rail and on either side of the first guide plates 78 and 79. A pair of first cutter blades 84 and 85 are also mounted on the guide rail 74 immediately behind guide protrusions 82 and 83. When the bird 47 passes the guide protrusions 82 and 83, these protrusions tend to seek the joints between the back and thighs of the bird, so as to guide the joints toward the first cutter blades 84 and 85, and the cutter blades cut the flesh that covers the joints.

Second guide protrusions 86 and 87 are also mounted to the guide rail 74 in positions behind the first cutter blades 84 and 85. Second cutter blades 88 and 89 are mounted behind the second guide protrusions 86 and 87, respectively. The second guide protrusions tend to seek the joints between the back and thighs of the birds 47, so that the joints are in alignment with the second cutter blades 88 and 89. The second cutter blades tend to cut through the joints as the birds pass through the back cutter 58.

Back conveyor assembly 71 is located parallel to and beneath guide rail 74 and its attachments. Back conveyor assembly 71 includes drive sprocket 94, enlarged drive sprocket 95, idler sprocket 96, and an endless conveyor chain 97 which extends about the sprockets 94, 95 and 96. Chain 97 includes teeth 98 that extend outwardly from the chain and which engage and clutch the backs 46 of the birds 47 as the birds move through the back cutter 58. The first guide plates 78 and 79 that extend beneath the guide rail 74 also extend about the large sprocket 95 and the conveyor chain that extends about the large sprocket in closely spaced relationship, so that the backs 46 that are cut away from the thighs 44 and 45 are pulled downwardly by the chain 97 and guide plates 78 and 79 and discharged beneath the back cutter 58 as the thighs and legs continue to move on their respective hangers. One or more deflector bars 100 are positioned adjacent the path of the conveyor chain 97 at the lower portion of the large sprocket 95 so as to deflect the backs 46 downwardly away from the large sprocket when the backs have been discharged from the first guide plates 78 and 79.

A pair of movable cutting blades 103 and 104 are positioned in straddling relationship with respect to conveyor chain 97 at the upper portion of large sprocket 95. The blades 103 and 104 are each mounted on the end of levers 105 and 106 that each are pivoted intermediate its ends, and the other end of each lever is connected to an air operated cylinder 107, 108. When the cylinders 107 and 108 are charged with air, the rod of the cylinder 107 is retracted so as to pivot the blades 103 and 104 toward the direction of the oncoming birds 47. When a bird engages the cutting blades 103 and 104, these blades tend to cut the exterior skin and meat at the joints between the back and the thighs of the birds, tending to separate the backs from the thighs. The air charged cylinders 107 and 108 permit the blades 103 and 104 to pivot in the direction of movement of the birds 47 so that the blades will not tend to cut through the bone at the joints of the birds, but will pivot so as to cause a slicing action with respect to the meat of the bird and cut around the joints.

After the birds have passed the cutting blades 84, 85, 88, 89, 103 and 104, the joints between the back and thighs of the birds will have been substantially separated, and the backs 46 of the birds can easily be separated from the thighs as the backs are pulled through a downward arc by the conveyor chain 97 as the legs and thighs continue to move in a horizontal path above the conveyor chain 97.

Figure 4:
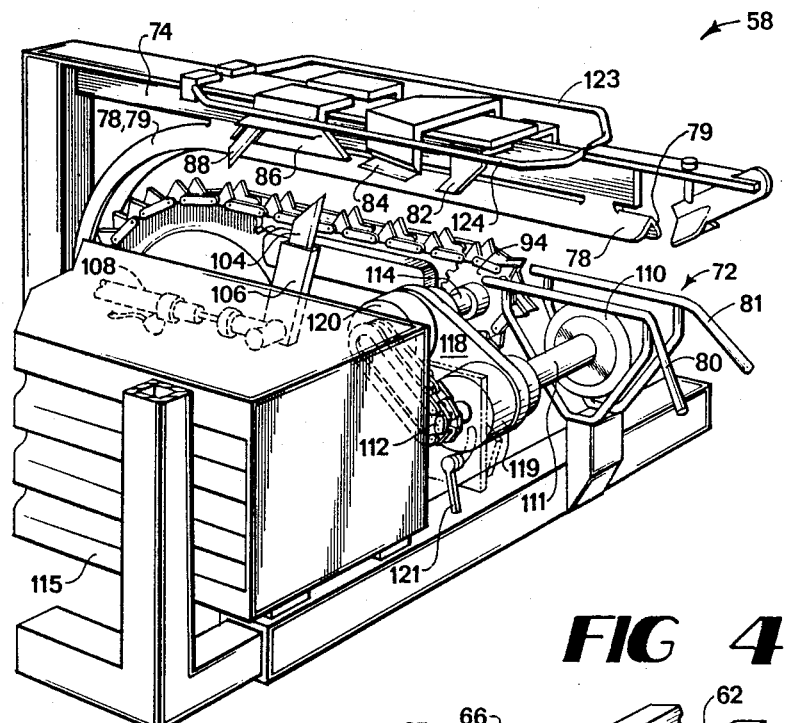
FIG. 4 is a perspective illustration of the back separating apparatus, showing the opposite side from that illustrated in FIG. 3.
Figure 5:
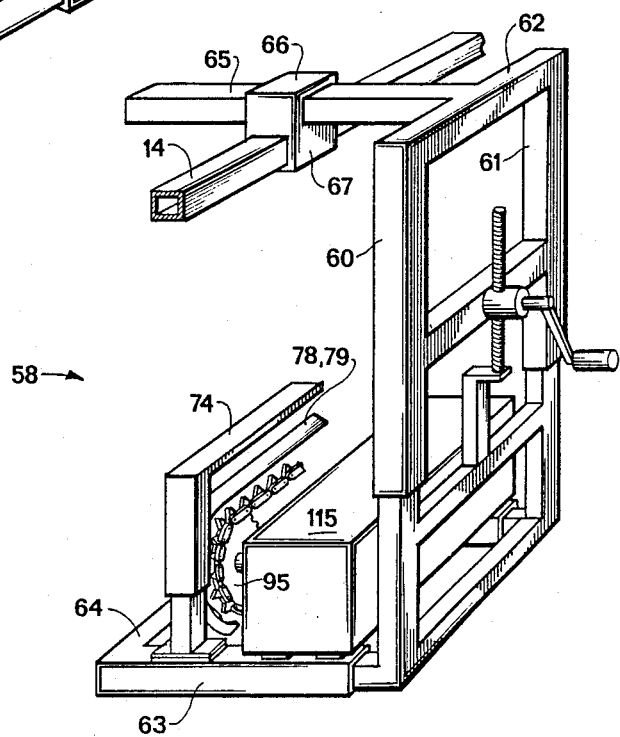
FIG. 5 is a perspective illustration of the support system of the back separating apparatus.

As illustrated in FIGS. 3 and 4, backbone cutter 72 comprises a disk cutter 110 positioned beneath and in alignment with guide rail 74, and in alignment with conveyor chain 97. As illustrated in FIG. 4, this cutter 110 is mounted on drive shaft 111, and a drive chain 112 is mounted to a sprocket of the drive shaft 111. Drive chain 112 also engages a sprocket of the drive shaft 114 of conveyor chain drive sprocket 94. Drive shaft 114 is rotated by an electric motor (not shown) in housing 115. A support plate 118 extends between drive shafts 111 and 114 and is mounted to bearings 119 and 120. The arrangement is such that the support plate 118 pivots about bearing 120 and permits the opposite bearing 119 to move in an arcuate path, so as to raise and lower disk cutter 110 toward and away from the oncoming birds 47 as the birds move through the back cutter 58. By loosening and tightening the screw 121, the disk cutter can be lowered and tightened in a position out of the way of the oncoming birds, or in the alternative, the screw can be loosened, the assembly raised, and the screw tightened so as to anchor the disk cutter in its proper cutting position. When in the raised position, the disk cutter engages and cuts longitudinally through the backbones of the birds 47 carried through the back cutter 58. When cut apart in this manner, the halves of the carcass tend to separate slightly and the carcass extends laterally to the side of the conveyor chain 97 and the stationary cutter blades 84, 85, 88, 89 and the movable cutter blades 103 and 104. Deflector bars 123 and 124 which extend laterally out from the guide rail 74 tend to spread the legs and thighs of the birds laterally so that the split back will straddle and not engage the stationary blades, etc., and allow the bird to pass about this portion of the back cutter.

Figure 6:
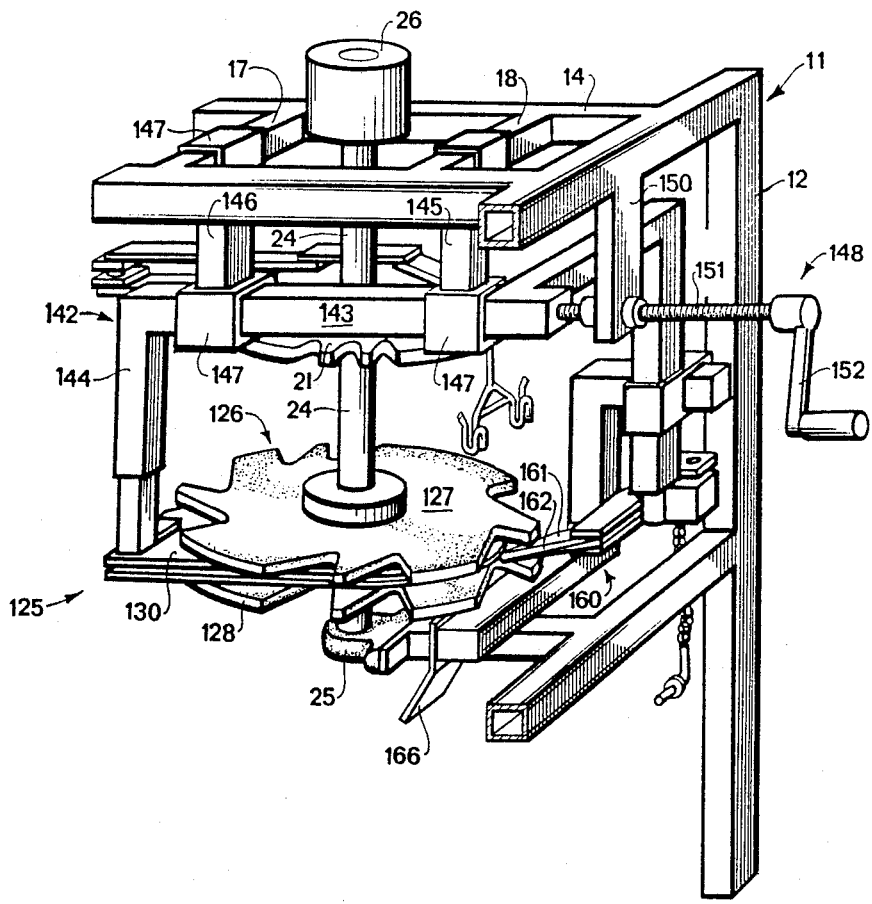
FIG. 6 is a perspective illustration of the rotary guide wheel, the cutter and the support system for these elements.
Figure 7:
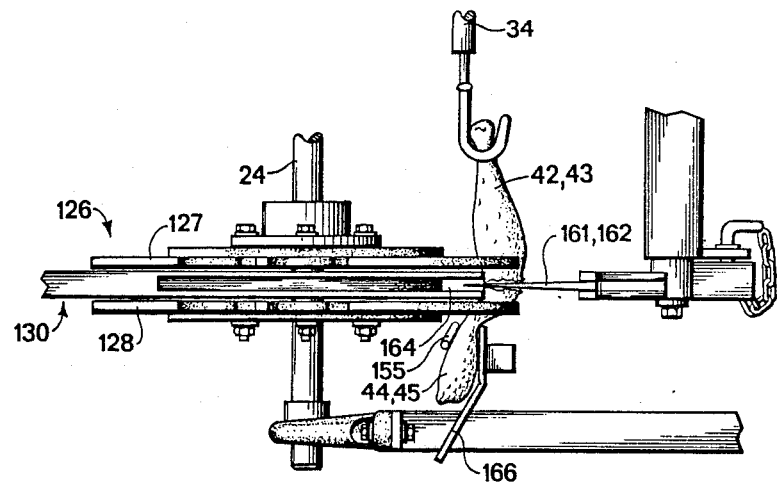
FIG. 7 is a side elevational view of the rotary guide wheel, showing the cutter as it cuts into the opened joint carried by the guide wheel.
Figure 8:
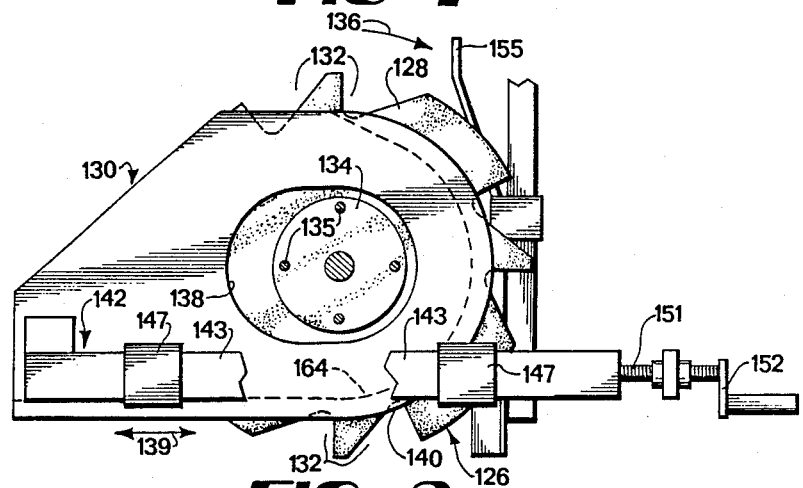
FIG. 8 is a plan view of the lower portion of the rotary guide wheel, the recess size adjustment plate and the adjusting mechanism used to move the recess size adjusting plate.
Figure 9:
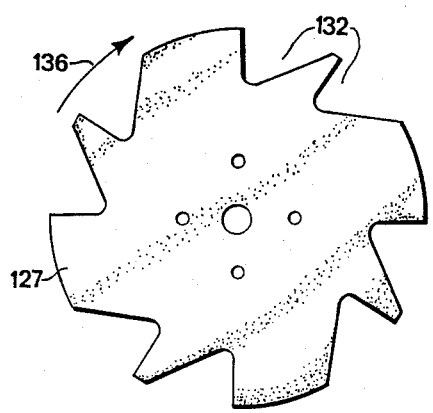
FIG. 9 is a plan view of the upper half of the rotary guide wheel which has been eliminated from FIG. 8.
Figure 10:
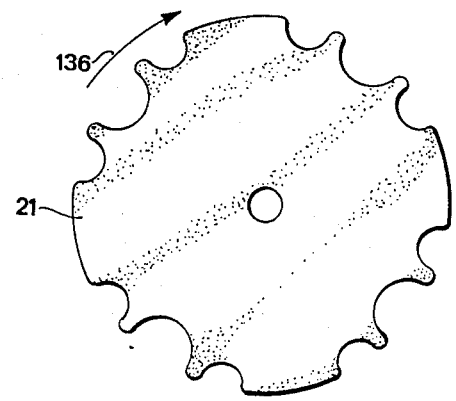
FIG. 10 is a plan view of the drive sprocket of the conveyor system.

As illustrated in FIG. 6, the legs-thigh separator 125 is mounted at the end portion of the assembly adjacent end frame 12. Rotary guide wheel 126 is mounted on axle 24 beneath drive sprocket 21 and is rotated in unison with the drive sprocket by electric motor 26. Rotary guide wheel 126 comprises upper and lower wheel plates 127 and 128 that are spaced apart, and a stationary recess size adjustment plate 130 is positioned between the upper and lower wheel plates. As illustrated in FIGS. 7 and 8, the upper and lower wheel plates 127 and 128 are substantially identically sized and shaped, with pairs of recesses 132 formed in the outer peripheral portion of the wheel plates. A central hub 134 is positioned between the wheel plates 127 and 128 and connecting screws 135 connect the wheel plates and hub together so that they rotate in unison as indicated by direction arrow 136.

The stationary recess size adjustment plate 130 defines an opening 138 that surrounds central hub 135 of the rotary guide wheel 126. The stationary recess size adjustment plate 130 is movable back and forth in the directions as indicated by the double headed arrow 139. An arcuate edge surface 140 is positioned so as to intersect and effectively cover and reduce the sizes of the recesses 132. When the size adjustment plate is moved to the right (FIG. 8), the effective sizes of the recesses become smaller, and when the size adjustment plate is moved to the left (FIG. 8) the effective sizes of the recesses 132 become larger.

As shown in FIGS. 6 and 8, the recess size adjustment plate 130 is movably supported by a suspended adjusting framework 142. Framework 142 includes horizontal leg 143, vertical leg 144, suspension bars 145 and 146 and crank adjustment assembly 148. Suspension bars 145 and 146 include sockets 147 at their upper and lower ends which are slidably mounted to the cross braces 17 and 18, and to the horizontal leg 143 of the suspended framework 142. Crank adjustment assembly 148 is mounted to a stationary beam 150 of the end frame 12 and its threaded shaft is threadedly received into an internally threaded socket in the end of horizontal leg 143 of the suspended framework 142. By rotating the crank lever 152, the suspended framework 142 moves along the length of the framework 11, and carries recess size adjustment plate 130 with it. When the suspended framework 142 moves toward the end frame 12, the recess size adjustment plate 130 moves in the same direction so that the arcuate edge surface 140 tends to cover more and more of the recesses 132 of the rotary guide wheel 126, which effectively reduces the horizontal depths of the recesses.

As illustrated in FIG. 7, the poultry legs 42 and 43 which are suspended from the hangers 34 extends at an angle sloped away and downwardly from the hangers into the recesses 132 of the rotary guide wheel 126, whereas the thighs 44 and 45 slope in the opposite downward direction. This causes a bending of the leg/thigh poultry part about the guide wheel as the legs/thighs are received in the recesses and are moved with the guide wheel. Additional guide bars 155 are used as necessary to assure that the thighs are bent inwardly beneath the guide wheel 126, as shown in FIGS. 7 and 8.

It will be noted from FIG. 7 that the slope of the poultry legs 142, 143 can be increased or decreased by movement of the size adjustment plate. For example, if the size adjustment plate 130 is moved further toward the end of the machine so as to effectively cover more and more of the recesses 132, the poultry legs 42, 43 will be required to assume a larger angle from the vertical. In the event that the joint of the leg/thigh poultry parts are relatively large, the movement of the size adjustment plate in this manner would tend to cause the legs to assume a greater angle, so that the larger legs would have their joints properly positioned at the perimeter of the rotary guide wheel 126. However, if shorter poultry legs 42, 43 are being processed, the size adjustment plate 130 would be moved in the opposite direction away from the end of the machine, so to cover less of the recesses 132, which would permit the legs 42, 43 to be less sloped and more vertical, whereby the shorter poultry legs would have their joints properly positioned in the recesses of the guide wheel.

As illustrated in FIG. 6, a joint cutter 160 is supported adjacent the guide wheel 126 and includes a pair of stationary blades, guide blade 161 and cutter blade 162. The blades are suspended from the same suspended framework 142 and are movable in unison with the recess size adjustment plate 130 when the crank assembly 148 is operated. The guide blade 161 and cutter blade 162 are both directed into the space between upper and lower wheel plates 127 and 128, and into a groove 164 (FIG. 7) formed at the arcuate edge surface 140 of the recess size adjustment plate 130. The guide blade 161 is not sharpened and tends to indent into the gap of the joint between the leg and thigh of the poultry carcass, so as to properly locate the joint at a position where the sharpened cutter blade 162 will cut into and through the opened joint, thereby separating the thighs 44, 45 from the legs 42, 43.

A deflector plate 166 is positioned beneath the guide wheel and is located so as to control the downward falling movement of the thighs 44, 45 after they have been separated from the legs 42, 43.

It will be understood that the foregoing relates only to a preferred embodiment f the present invention, and that numerous changes and modifications may be made therein without departing from the spirit and scope of the invention as set forth in the following claims.

I claim:

1. A poultry processing apparatus of the type used to separate parts of poultry carcasses as the carcasses are suspended invertedly by their legs and conveyed in series along a processing path, comprising
    a rotary guide wheel rotatable about an approximately upright axis, with the periphery of the guide wheel to be positioned in the path of the carcasses, said guide wheel including a series of generally radially extending protrusions with poultry part receiving recesses formed between said protrusions with the recesses sized and shaped to receive and guide the portions of the carcass to be separated,
    cutting means positioned adjacent the peripheral portion of said guide wheel arranged for cutting the poultry parts guided by said guide wheel,
    a recess size adjustment member including an edge portion located adjacent the bases of the recesses as the recesses move adjacent said cutting means, with said size adjustment member and said guide wheel being positioned in relative overlying relationship, and
    means for changing the position of said recess size adjustment member to move the edge portion of said recess size adjustment member outwardly of the guide wheel to effectively cover an increased portion of the recesses of the guide wheel or to move the edge portion of said size adjustment member inwardly of the guide wheel to effectively cover less of the recesses of the guide wheel.

2. The apparatus of claim 1 and wherein said recess size adjustment member comprises an adjustment plate and wherein said edge portion of said recess size adjustment plate comprises an arcuate edge portion formed on said adjustment plate positioned in the path of movement of the recesses as the recesses move adjacent said cutting means.

3. The apparatus of claim 1 and wherein said means for changing the position of said recess size adjusting member comprises travel screw means for moving said recess size adjusting member with respect to said guide wheel.

4. The apparatus of claim 1 and wherein said guide wheel comprises a pair of overlying parallel spaced apart guide wheel plates mounted to and rotatable about a vertical axle, and wherein said recess size adjustment means comprises a stationary adjustment plate positioned parallel to and between said guide wheel plates.

5. The apparatus of claim 4 and wherein said stationary adjustment plate defines a central opening positioned about the upright axis of said guide wheel.

6. The apparatus of claim 1 and further including stationary guide means positioned about the periphery of said guide wheel adjacent the cutting means and arranged to engage and urge the poultry parts into the recesses of said guide wheel as the poultry parts are cut by said cutting means.

7. The apparatus of claim 1 and wherein said means for changing the position of said recess size adjustment member includes means for changing the position of said cutting means in unison with the change of position of said recess size adjustment member.

8. The poultry processing apparatus of claim 1 further comprising a second cutting means comprising a disk cutter adapted to cut along the backbone of the poultry carcasses to divide the poultry carcasses in half as the poultry carcasses are moved along the processing path, said disk cutter being movably mounted for movement between positions in and out of the path of the poultry carcasses, a pair of hip joint cutting means positioned to cut on opposite sides of the backbone of the poultry carcasses to separate the backs of the carcasses from the thighs and legs of the carcasses, and means for securing the disk cutter in the positions in and out of the path of the poultry carcasses, whereby when the disk cutter is in the path of the poultry carcasses the poultry carcasses are halved and when the disk cutter is not in the path of the poultry carcasses the back is removed in one piece from the poultry carcasses.

9. The apparatus of claim 1 further comprising means for removing the legs from the back portion of the poultry, said leg removal means comprising:
  gripper means for gripping a back portion of the bird;
  means for moving said gripper means and the back portion along a closed conveyor path and away from the legs of the bird;
  cutting blades positioned for cutting the legs of the bird adjacent the back portion; and
  means for retaining the back portion of the bird adjacent said gripper means as the back portion is moved away from the legs.

10. A method of separating thighs from the legs of poultry carcasses comprising:
  hanging a plurality of poultry legs with thighs joined thereto by the leg knuckle to a series of conveyor hangers of a suspended conveyor system,
  moving a series of joined legs and thighs with the hangers of the conveyor system along a processing path about a rotary guide wheel with the joints between the legs and thighs being received in recesses of the guide wheel,
  bending the legs and thighs at their joints about the guide wheel,
  cutting with a cutting element into the joints of the legs and thighs as the legs and thighs are bent about the guide wheel, and
  changing the effective size of the recesses of the rotary guide wheel at the position of the cutting element when longer or shorter legs and thighs are to be cut apart.

11. The method of claim 10 and wherein the step of changing the effective size of the recesses of the rotary guide wheel comprises moving a curved surface in overlying relationship with the recesses of the rotary guide wheel in directions that overlie more of or less of the recesses of the rotary guide wheel.

* * * * *